3,657,224
METHOD FOR THE PRODUCTION OF
PENICILLINS
Leon John Heuser, Robbinsville, N.J., assignor to E. R.
 Squibb & Sons, Inc., Princeton, N.J.
No Drawing. Continuation-in-part of application Ser. No.
 729,535, May 16, 1968, which is a continuation-in-part
 of application Ser. No. 654,690, July 20, 1967. This
 application Sept. 10, 1970, Ser. No. 71,226
Int. Cl. C07d 99/16
U.S. Cl. 260—239.1                                  18 Claims

ABSTRACT OF THE DISCLOSURE

This invention relates to a new process for the production of penicillin compounds. The process comprises reacting an imine derivative of 6-aminopenicillanic acid or a salt thereof with an acylating agent, such as an acyl halide or acid anhydride, and hydrolyzing the intermediate reaction product to obtain the desired penicillin compound.

---

This invention is a continuation-in-part of application Ser. No. 729,535, filed May 16, 1968, now abandoned which is in turn a continuation-in-part of application Ser. No. 654,690, filed July 20, 1967, now abandoned.

SUMMARY OF THE INVENTION

A wide variety of penicillins are known as antibacterial agents, See, for example, U.S. Pats. Nos. 2,951,839; 2,985,648; 2,996,501; 3,040,032; 3,080,356; 3,082,204; 3,120,514; 3,132,136; 3,157,639; 3,174,964; 3,239,507; 3,245,983; which are merely illustrative but not inclusive. The more important penicillins among these, in view of their wide acceptance and usage, include penicillin G, penicillin V, penicillin O, phenethicillin, methicillin, oxacillin, ampicillin, nafcillin, cloxacillin, dicloxacillin, (as well as various salt forms). See, for example, New Drugs, 1966 edition (Amer. Med. Assn., Chicago, page 9, et seq.

The penicillins, as commonly known, are characterized by an acyl radical attached to the amino group of 6-amino-penicillanic acid. This last compound is frequently referred to as 6–APA and unless otherwise specified, this abbreviation as used hereafter in general discussion is intended to include the free acid form as well as various salts and esters formed with the carboxy group, e.g., alkali metal salts, alkaline earth metal salts, tertiary amine salts and the like, as well as alkyl and aralkyl esters.

This invention comprises a new method for synthesizing penicillins of the class described above. This method broadly involves the improvement of acylating an imine derivative of 6–APA and hydrolyzing the intermediate reaction product. More particularly, this method comprises acylating an imine derivative of 6–APA which is the reaction product of 6–APA, either in the acid, salt or ester form, with an aldehyde. The imine derivatives offer a very selective method, either by extraction or precipitation, for freeing 6–APA from impurities and they also offer a wider range of pH and choice of solvent for the acylation than 6–APA.

These imine derivatvies may be represented by the formula (I) 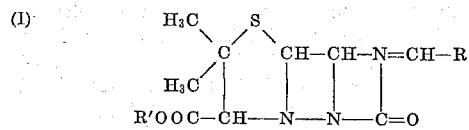

in which R is hydrogen, alkyl, aryl, or aralkyl and R' is hydrogen, alkyl or aralkyl or a salt forming ion such as alkali metal, alkaline earth metal or amine. The substance of Formula I is acylated with an acylating agent, R"COX, e.g., acid halide, anhydride, ester, amide, azide, cyanide or the like, containing the acyl radical R"CO— desired in the final product. An intermediate is formed which may be represented by the formula (II) 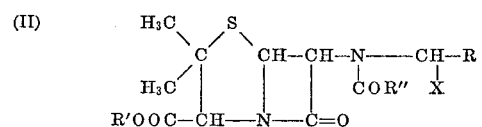

R and R' have the meaning as above, COR" represents the acyl radical of the acylating agent and X is the residual moiety of the acylating agent, i.e., OH, halogen, O-acyl, O-aryl, $NH_2$, CN, $N_3$. The intermediate of Formula II may be isolated but preferably is hydrolyzed directly to the final product which may be represented by the formula (III) 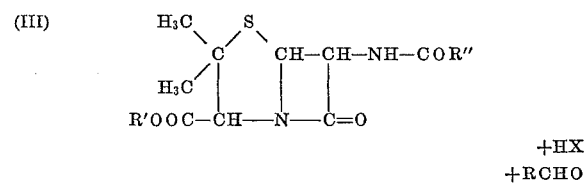

+HX
+RCHO

DETAILED DESCRIPTION OF THE INVENTION

In general throughout this specification the terms represented by the various symbols R have the following meanings. The alkyl groups are straight and branched chain hydrocarbon radicals having up to about 12 carbons in the chain. Generally, lower alkyl groups of up to seven carbon atoms are preferred. Alkenyl, alkadienyl and alkynyl groups are unsaturated groups of the same character having respectively, one or two double bonds or a triple bond. Cycloalkyl includes cycloaliphatic rings of 3 to 7 carbons. The aryl groups are monocyclic carbocyclic or bicyclic carbocyclic aryl groups. The aralkyl groups have aryl groups of the same kind attached to a lower alkyl group of up to seven carbon atoms. In addition, these aryl and aralkyl groups may include 1 to 3 simple substituents such as halo (which includes all four common halogens, but with chlorine and bromine being preferred), hydroxy, nitro, lower alkyl or lower alkoxy. Acyl refers to the acyl radical of an acid, acid halide, acid anhydride or the like. Joined to the carbonyl radical of the acyl group may be a substituted or unsubstituted alkyl, aryl or aralkyl group of the type described as well as a heterocyclic radical. Heterocyclics in this or other connections are 5- to 6-membered (exclusive of hydrogen) monocyclic heterocyclic containing nitrogen, oxygen or sulfur (not more than two hetero atoms), or such a heterocyclic attached to a carbon chain. The heterocyclic may be substituted as illustrated below.

The acylation of the imine derivative I is effected by adding the acylating agent or a solution thereof to the derivative dissolved in a aqueous or organic solvent. In general the reaction proceeds more rapidly, the more acid the component HX.

Inert organic solvents which may be used include ether, dioxane, benzene, dimethylformamide, ketones (acetone, methyl isobutylketone, methyl cyclohexanone, etc.) and chlorinated solvents (methylene chloride, chloroform, etc.). The reaction may also be carried out in a mixture of these solvents and water. Anhydrous conditions are preferred when the acylating agent may be decomposed by water during the reaction. In general, anhydrous conditions are also preferable in the case of the more reactive imine derivatives, e.g., those obtained from benzaldehyde, m-chlorobenzaldehyde, acetaldehyde, phenylacetaldehyde, etc. Aqueous conditions are generally preferable if a less reactive imine derivative, e.g., those obtained from salicylaldehyde, chlorosalicylaldehyde, hydroxynaphthaldehyde or the like is used.

The acylation may be performed at a pH of 3-9. Aqueous acid conditions are to be avoided for those imines which are rapidly hydrolyzed by these conditions. Temperatures normally vary from about —20° C. to room temperature.

If the 6–APA derivative is in the form of a salt with an amine which can be acylated, it is preferable to convert this to the free acid prior to acylation, e.g., by extracting the amine with an acid such as hydrochloric acid. When the acylation is effected in aqueous medium, hydrolysis usually occurs spontaneously upon formation of the intermediate. Where a non-aqueous system is utilized for acylation, addition of water to the intermediate reaction product effects hydrolysis to the desired penicillin. It is sometimes desirable to add alkali or acid to complete the hydrolysis.

On completion of the hydrolysis, the penicillin formed may be isolated by conventional procedures. The penicillin may be crystallized as the sodium or potassium salt from an organic solvent such as butanol, methyl isobutylketone or isobutylacetate; or as the free acid from water. Alternatively, the penicillin may be purified by extraction as the free acid into a water immiscible organic solvent (at about pH 2.0-2.5) and reverse extraction into water as a salt at neutral pH.

The imine of 6–APA represented by Formula I above is formed by the reaction of 6–APA, either in free acid form or as an ester or as a salt with a base, with an aldehyde. Either an organic solvent or aqueous medium may be used. If 6–APA itself is used, the reaction with the aldehyde is preferably effected at a pH of about 3 to 5. When a salt or ester of 6–APA is used, the reaction occurs at about pH 6 to 8.

The salt of 6–APA with any base may be used, e.g., ammonium salts, alkali metal salts such as sodium and potassium, alkaline earth metal salts such as calcium and magnesium, and amines. Organic amine salts such as lower alkylamines like triethylamine, aralkylamines like dibenzylamine, ethylenediamine, N,N'-dibenzylethylenediamine and other amines which have been used to form salts with benzylpenicillin may be utilized. Organic amines of more than 6 carbon atoms when used in conjunction with aldehydes of higher molecular weight (e.g., salicylaldehyde) are useful because imine derivatives of such organic amine salts of 6–APA are water insoluble, a property which aids in their formation and separation from crude 6–APA solution.

Instead of a salt, an ester may be used, e.g., alkyl or aralkyl esters. R' in the formulas may therefore be straight or branched alkyl up to about 12 carbons, preferably lower alkyl such as methyl, ethyl, propyl and the like, aryl or aralkyl as defined above, but preferably phenyl or simply substituted phenyl (as discussed below with respect to the aldehydes), and unsubstituted or substituted phenyl alkyl groups of the same type.

Any aldehyde may be used to form the starting material of Formula I. These include lower alkanals such as formaldehyde, acetaldehyde, isopentaldehyde and heptaldehyde, higher alkanals of up to about 12 carbon atoms such as octaldehyde, 2-ethyl-hexaldehyde, nonyl aldehyde, capraldehyde, laurylaldehyde and the like, alkanals like the foregoing substituted with 1 to 2 halo, hydroxy, nitro or alkoxy groups, aralkanals, especially phenyl lower alkanals, such as benzaldehyde, phenylacetaldehyde, hydrocinnamaldehyde, 2 - phenylpropionaldehyde, cuminic aldehyde and 1-naphthaldehyde as well as aralkanals such as the foregoing substituted with 1 to 2 halo, hydroxy, nitro or alkoxy groups such as p-chlorobenzaldehyde, salicylaldehyde, o-, m- or p-methoxybenzaldehyde or the like, aralkenals, e.g., mono-unsubstituted aldehydes coresponding to the foregoing aralkanals such as cinnamaldehydes or the like, and heterocyclic substituted alkanals such as 2-furaldehyde, 2-thiophenaldehyde, pyridine-4-aldehyde and the like.

Thus R in the foregoing formulas may represent hydrogen, alkyl up to about 12 carbon atoms, alkenyl up to about 12 carbon atoms, aryl or substituted aryl, especially phenyl, naphthyl and halo-, hydroxy-, nitro-, lower alkyl or lower alkoxy- substituted phenyl or naphthyl, the corresponding unsubstituted or substituted aralkyl and aralkenyl groups and heterocyclic or heterocyclic-lower alkyl groups.

Any acylating agent R"CO—X may be used which gives the desired acyl radical in the penicillin product, e.g., acyl halide or acid anhydride, including mixed anhydrides, N-carboxy anhydrides [as described in Advances in Protein Chemistry, vol. XIII (Academic Press, New York, 1958), pages 248 to 271] and the thio analogs of such N-carboxy anhydrides, N-protected acyl compounds as, for example, condensation products of an α-amino acid or salt thereof with a β-diketone of β-keto-ester [as described in Angew. Chemie., 74, 873 (1962)], etc. These include, for example, α-hydroxyphenylacetyl chloride, α-methoxyphenylacetyl chloride, phenylpropionyl chloride, α-phenoxypropionyl chloride, α-phenoxybutyryl chloride, 2,6-dichlorobenzoyl chloride, 2-methoxybenzoyl chloride, D(—)-2-phenylglycyl chloride hydrochloride, 3-methyl-5-pyridylisoxazole-4-carbonyl chloride, 3,5-dimethylisoxazole-4-carbonyl chloride, n-valeryl chloride, heptanoyl chloride, etc.

Acetic anhydride, heptanoic anhydride, mixed anhydride from ethylchlorocarbonate and α-(3-pyridyl) acetic acid, mixed anhydride from isobutylchlorocarbonate and α-carbobenzoxy aminophenyl acetic acid, Leuch's anhydride of α-aminophenylacetic acid, mixed anhydride from α-aminophenyl acetate (or salt thereof) with methyl acetoacetate, etc., may also be used.

Thus the radical COR" in Formulas II and III reflects the acyl moiety and X is the residual moiety of the acrylating agent. X may be OH, halogen, O-acyl, O-aryl, $NH_2$, CN or $N_3$. R" may represent, among others, radicals such as alkyl, preferably lower alkyl and especially having 4,6 or greater than 7 carbon atoms in a straight chain, branched chain and substituted alkyl in which the substituent is isothioureido, hydroxy, dithiocarbamyl, N,N-dimethyl-dithiocarbamyl, iodo, fluoro, acylmercapto, preferably lower alkanoylmercapto, nitro, cyano, isonitroso, o-phenylenedioxy, carbamyl, epoxy, acyl, substituted acyl, preferably alkanoyl, carboxymethylamino, phosphono, α-amino, alkylamino, acylamino, preferably lower alkanoylamino, mercapto, acyloxy, preferably lower alkanoyloxy, carboxamido, N-alkyl-substituted carboxamido, N-aryl-substituted carboxamido, carboalkoxy, carboaryloxy, N-phenylhydrazino, carbohydrazino, arylamino, amino substituted with a monocyclic nitrogen heterocyclic (five or six-membered ring containing nitrogen), alkyl group substituted with a heterocyclic radical selected from the group of monocyclic heterocyclics with 5 or 6 membered rings and condensed rings containing nitrogen and oxygen, monocyclic heterocyclics containing an atom of sulfur and condensed heterocyclics with six members containing an atom of sulfur, ω-carboxyalkyl containing a sulfonyl group in the chain or alkyl containing a sulfinyl group in the chain (especially such lower alkyl containing groups), alkenyl, especially lower alkenyl, as well as those in which a substituent is present, e.g., hydroxyl, trifluoromethyl, cyano, carboxyl, carbonyl, benzoyl, heterocyclo, methoxyl, alkyl or sulfonyl styryl unsubstituted or substituted in the nucleus with a group such as fluoro, nitro, methoxy or hydroxy; styryl substituted in the lateral chain in which the substituent is cyano, phenyl, methyl or methoxy; alkadienyl and alkadienyl substituted with chloro and 3,4-methylenedioxyphenyl (especially such lower alkadienyl groups); alkynyl and alkynyl substituted (especially such lower alkynyl containing groups) with carboxyalkyl, aryl and substituted alkyl, polycyclic saturated and unsaturated hydrocarbons containing more than 6 carbon atoms in the chain and substituted derivatives of such radicals; alicyclics containing at least six carbon atoms in the chain and substituted derivatives of such radicals; alkyl substituted with a mono or polycyclic saturated or unsaturated hydrocarbon in which the alkyl group contains at least two carbon atoms and substituted derivatives; chloralkyl and polychloralkyl in which the alkyl group contains at least two carbon atoms; bromalkyl and polybromoalkyl in which the alkyl group contains at least 3 carbon atoms; carboxyalkyl and substituted carboxyalkyl in which the substituent is bromo, fluoro, phenyl, carbonyl, carboxy, α-amino, substituted amino, alkylmercapto, (especially lower alkylmercapto), mercapto and nitro; α-substituted benzyl in which the substituent is hydroxy, methoxy, o-hydroxyphenyl, acetoxy and 1-hydroxy-1-cyclopentyl; nuclear substituted benzyl in which the substituent is chloracetamido, carboxy, formamidomercapto and 3,4 - dimethoxy; α-substituted phenoxymethyl in which the substituted is bromo or chloro; substituted phenyl in which the substituent is nitro, cyano, carboxy, carboxamido, N-alkyl or N-aryl-substituted carboxamido, cyanomethyl, carbalkoxy, carbaryloxy, carboxyphenylidthio, acyl (especially lower alkanoyl), acyloxy (especially lower alkanoyloxy), benzylidenehydrazino, amino, alkylamino, arylamino, acylamino (especially lower alkanoylamino), halogen, carbamyl, methylenedioxy, alkyl, phenyl, carboxyphenyl, alkoxy (especially there may be mentioned aniline, o-, m- or p-toluidine, o-, lower alkoxy), aryloxy, azo, acyloxy (especially lower alkanoyloxy), phosphoric, hydroxythio, thioakyl, thioaryl, trifluoromethyl, carboxymethyl, formyl, aryl, dichlorosulfamyl, substituted aryl and aralkyl; monocyclic heterocyclics of 5 or 6 members containing a heterocycle consisting of nitrogen, sulfur, nitrogen and sulfur, nitrogen and oxygen, oxygen and sulfur and their substituted derivatives; monocyclic heterocyclics with 6 members containing an atom of oxygen and their substituted derivatives; furyl substituents; condensed heterocyclics with 5 or 6 members with at least one of the heterocyclic atoms being nitrogen, oxygen and sulfur and their substituted derivatives; mono-nuclear substituted phenoxyalkyls in which the substituent is 2-hydroxybenzyl, crotyl, phenyl, carboxamido, allyl, acetyl, carboxymethoxybenzyl, carboxymethoxy; phenoxyalkyl polysubstituted in the nucleus with chloro, the alkyl containing 1 to 5 carbon atoms or carboxymethoxy; mercaptoalkyl substituted on the sulfur with ω-carboxyalkyl, benzothiazyl, p-mercaptophenyl, dithiophenyl, naphthoxymethyl substituted in the nucleus with methyl and 2 - carboxymethoxy-1-naphthylmethyl; α-bromobenzhydryl, triphenylmethyl, α,β - dibromotriphenylmethyl-2,4-dicarbomethoxy-3,5-hydroxybenzyl, substituted cyclohexyl or α-chloro-o-hydroxyphenoxymethyl, etc.

In the preferred category as starting materials are the salicylaldehyde, phenylacetaldehyde, anisaldehyde, benzaldehyde or acetaldehyde derivatives of 6–APA itself and especially of the ammonium, potassium, octylamine or triethylamine salt of 6–APA. Especially preferred are the salicylaldehyde or benzaldehyde derivative of 6–APA itself or the tert.-octylamine salt. Most especially, the benzaldehyde derivative or the t-octylamine salt thereof is preferred. Preferred acylating agents include phenoxyacetyl chloride, α-phenoxypropionyl chloride, 2,6-dimethoxybenzoyl chloride, 5 - methyl-3-phenylisoxazole-4-carbonyl chloride, mixed anhydride from an amine protected derivative of D(—)-α-aminophenyl acetic acid especially N-carboxy anhydride of phenyl glycine and carbobenzoxy protected phenyl glycine, 2 - ethoxy - 1-naphthoyl chloride, 3-o-chlorophenyl-5-methylisoxazole-4-carbonyl chloride, 3-(2,6-dichlorophenyl)-5-methylisoxazole-4-carbonylchloride which yield the more important penicillins-penicillin V, penicillin G, phenethicillin, methicillin oxacillin, ampicillin, nafcillin, coxacillin and dicloxacillin, respectively.

The following examples are illustrative of the invention. All temperatures are expressed on the centigrade scale.

EXAMPLE 1

A solution of salicylaldehyde derivative of 6–APA is obtained by extracting a crude penicillin G hydrolysate at pH 3.5 with a solution of salicylaldehyde in methylcyclohexanone. To the solution, containing the equivalent of 1 g. of 6–APA, is added dropwise 1 ml. phenoxyacetyl chloride. After the addition is complete, the reaction is allowed to continue for 30 minutes. The layers are then separated and the organic solvent layer extracted with an equal volume of water at pH 6.5 using 20% NaOH for neutralization. Freeze drying yields 930 mg. of crude penicillin V. Purification is effected by dissolving the solids in BuOH saturated with water followed by concentration under vacuum to remove the water present. The crystalline material, after filtration and drying, has a potency of 970 γ/mg. as penicillin V.

EXAMPLE 2

2 g. of the salicylaldehyde derivative of the t-octylamine salt of 6–APA is slurried in a mixture of 16 ml. MIBK and 16 ml. water. After acidification to pH 3.0 with concentrated HCl and 10 minutes agitation, the aqueous layer containing t-ocylamine hydrochloride is removed. The solvent layer is then mixed with an equal volume of acid phosphate buffer (pH 3.0) and 0.8 ml. 5-methyl-3-phenylisoxazole-4-carbonyl chloride is added. The acylation is continued at 35° C. for 50 minutes. The solvent layer is separated and mixed with 4 ml. of a 20% solution of sodium 2-ethyl-hexanoate in MIBK. Crystallization starts in 10 minutes and is continued for 1 hour. After filtration, the crystals are washed with MIBK and acetone and dried. Yield 960 mg. of sodium oxacillin at 995 γ/mg.

EXAMPLE 3

The potassium salt of the salicylaldehyde derivative of 6–APA is obtained by adding anhydrous potassium acetate to a solution of the aldehyde derivative free acid in MIBK. 10 g. of the potassium salt are dissolved in 50 ml. water and 2.2 ml. 5-methyl-3-phenylisoxazole-4-carbonyl chloride in 10 ml. acetone are added slowly maintaining a pH of 7.0–8.0 with 20% potassium hydroxide. After the addition is completed, the solution is agitated an additional 45 minutes. 100 ml. butyl alcohol are then added, the mixture cooled to 5–10° C., and the pH adjusted to 2.0 with concentrated HCl. The organic solvent layer is separated and adjusted to pH 7.3 with 20% potassium hydroxide. Concentration to about 70 ml. gives a crystalline precipitate which is filtered and dried. Yield 7.2 g. oxacillin potassium salt.

EXAMPLE 4

10 g. triethylamine salt of the acetaldehyde derivative of 6-aminopenicillanic acid is dissolved in 100 ml. methylene chloride. The solution is cooled to 0–5° and 7 g. 2,6-dimethoxybenzoyl chloride is added dropwise over a period of 1½ hours, maintaining the same temperature. After an additional 30 minutes, the solution is mixed with an equal volume of cold (5°–10°) phosphate buffer (pH 7.5). To complete the hydrolysis of the intermediate, the pH is adjusted to pH 2.0 and the mixture is agitated for 15 minutes. The aqueous layer is discarded and the acid organic solvent layer is mixed with 50 ml. of cold water and neutralized to pH 7.5 with 20% sodium hydroxide. The aqueous solution is separated and concentrated into 100 ml. methyl isobutylketone. After standing overnight in the cold room, the crystals are filtered and dried to yield 11 g. of methicillin.

EXAMPLE 5

To 100 ml. aqueous solution (pH 8.0) of 10 g. crude 6–APA are added 8 g. freshly distilled phenylacetaldehyde. After 2 hours agitation at room temperature, 250 ml. of methyl cyclohexanone are added and the pH adjusted to 4.0 with HCl. After 30 minutes the phases are separated and the rich organic solvent is dried by azeotropic distillation of the water present. The triethylamine salt is prepared by the addition of 6.5 ml. of amine.

The solution is cooled to 0–5° and a mixture of 9.5 g. D(—)-2-phenylglycyl chloride hydrochloride in 100 ml. of methyl cyclohexanone is added over a period of 1 hour, maintaining a pH of 0–5° C. After an additional hour agitation, 100 ml. cold phosphate buffer at pH 7.5 is added and the pH adjusted to 2.0. The solvent layer is discarded and the aqueous layer adjusted to pH 5.0. After 1 hour, filtration and drying yields 8 g. of ampicillin.

By substituting the reaction product of sodium D(—)-α-aminophenyl acetate with methyl acetoacetate for the D(—)-2-phenylglycyl chloride hydrochloride in the foregoing procedure, ampicillin is also produced.

EXAMPLE 6

The mixed anhydride from 3-o-chlorophenyl-5-methylisoxazole-4-carboxylic acid is prepared by treatment of a cold (—5°) acetone solution (100 ml.) of 8.0 g. of the acid with 3.4 g. ethylchlorocarbonate. After 30 minutes agitation at —5 to —10°, the acylating mixture is added to a cold solution of 10 g. benzylidene-6-aminopenicillanic acid, potassium salt, in 200 ml. water. The solution is allowed to rise to room temperature and agitated 1 hour at this temperature. After extraction with 150 ml. methyl isobutyl ketone, the aqueous layer is separated and mixed with a second portion of 150 ml. methylisobutyl ketone. The mixture is cooled to 5–10° C. and acidified with 20% $H_2SO_4$ to pH 2.0.

The rich solvent after separation is treated with 45 ml. of 25% sodium 2-ethylhexanoate in methylisobutyl ketone. After 2 hours agitation, the crystalline precipitate is filtered and dried to yield 15 g. of cloxacillin.

EXAMPLE 7

125 gm. of 6–APA are dissolved in 2.5 liters of water. Sodium hydroxide is added to pH 8. 116.5 ml. of benzaldehyde and 500 ml. of an aqueous solution containing about 50% t-octylamine hydrochloride are added. The mixture is stirred for one hour, filtered and washed with 500 ml. of water and 250 ml. of toluene, then dried under high vacuum. There are obtained 241.6 gm. of the benzylidene derivative of 6–APA t-octylamine salt.

Methyl isobutyl ketone is dried over molecular sieves. 5 gm. of the benzylidene derivative of 6–APA t-octylamine salt are slurried in 50 ml. of this solvent cooled to 5–10° C. 1.6 ml. of phenoxyacetyl chloride are added. The crystalline derivative rapidly dissolves and t-octylamine hydrochloride precipitates.

After one half hour, the precipitate is filtered and the intermediate is hydrolyzed for one half hour with 25 ml. of water. The phases are separated and the solvent treated with 14 ml. of a solution of sodium ethyl hexanoate in methyl isobutyl ketone (about 1 N concentration).

Sodium phenoxymethyl penicillin crystallizes and is filtered after one hour. Yield 3.5 gm.

The same product is obtained by substituting anhydrous ether for the methyl isobutyl ketone as solvent for the acylation and substituting butanol for the methyl isobutyl ketone as solvent for the methyl hexanoate.

EXAMPLE 8

Ampicillin is obtained by the procedure of Example 5 by substituting the benzylidene derivative of 6–APA t-octylamine salt of Example 7 for the phenylacetaldehyde and using methylene chloride as the solvent.

EXAMPLE 9

By substituting for the phenoxyacetyl chloride in the procedure of Example 7, 3-(2,6-dichlorophenyl)-5-methyl-isoxazole-4-carbonyl chloride, dicloxacillin is obtained.

EXAMPLE 10

By substituting for the phenoxyacetyl chloride in the procedure of Example 7, 3-o-chlorophenyl-5-methyl-isoxazole-4-carbonyl chloride, cloxacillin is obtained.

EXAMPLE 11

125 g. of D(—)-α-phenylglycine are slurried in 125 ml. of tetrahydrofuran and warmed to 40°. Phosgene is slowly introduced at a rate to maintain a temperature of 45–50°. The addition is continued until the solution clears (2 hrs. 10 min.) and nitrogen is passed through to remove excess phosgene. The solution is then concentrated under vacuum to 265 ml. and 80 ml. of hexane are added slowly with rapid agitation over a period of 20 minutes. The slurry is kept in the cold for 1 hour and then the crystals are filtered and washed with an additional 20 ml. of hexane. The N-carboxy-D-phenylglycine anhydride is dried overnight under vacuum over $P_2O_5$.

Five grams of the anisylidene derivative of 6–APA t-octylamine salt (prepared by the procedure of Example 5) is slurried in 100 ml. of chloroform and the mixture cooled to about 0° C. One milliliter of methanolic HCl (3.6 N) is added to dissolve the Schiff base.

2.1 g. of N-carboxy-D-phenylglycine anhydride (10% excess) is added portionwise over a period of 15–20 minutes. After two hours total reaction time at about 0° C., 50 ml. of water is added and the mixture is stirred cold for ½ hour at pH 5.2. After allowing the mixture to warm to room temperature, the solids are filtered off and the layers separated. The aqueous layer is concentrated under vacuum to remove excess solvent and neutralized to pH 7.8 t-octylamine. Addition of 0.7 ml. benzaldehyde yields 1.8 to 1.9 gm. of the Schiff base of ampicillin. This product is then hydrolyzed as in Example 5 to obtain free ampicillin.

EXAMPLES 12 TO 35

In the procedure of Example 7 the phenoxyacetyl chloride is replaced by an equimolar amount of the acid chloride of α-(2-chlorophenoxy)propionic acid,
α-(4-sulfamylphenoxy)-n-butyric acid,
α-(3,4-dimethoxyphenoxy)-n-pentanoic acid,
α-(3-methylphenoxy)isovaleric acid,
α-(4-methylthiophenoxy)propionic acid,
α-(4-dimethylaminophenoxy)-n-hexanoic acid,
α-(2-methoxyphenoxy)-n-decanoic acid,
α-(2,4-dichlorophenoxy)phenylacetic acid,
α-(2-nitrophenoxy)-β-phenylpropionic acid,
α-(2-acetamidophenoxy)-γ-phenylbutyric acid,
α-(2,4-dimethylphenoxy)-n-butyric acid,
α-(4-isopropylphenoxy)propionic acid,
α-(3-bromophenoxy)-n-butyric acid,
α-(2-iodophenoxy)phenylacetic acid,
α-(2-diethylaminophenoxy)isovaleric acid,
α-(3,5-dichlorophenoxy)isohexanoic acid,
α-(4-cyclohexylphenoxypropionic acid,
α-phenoxy-isovaleric acid,
α-phenoxy-n-decanoic acid,
α-phenoxy-γ-phenylbutyric acid,
α-(2-benzylphenoxy-n-butyric acid,
α-(2-trifluoromethylphenoxypropionic acid, and
α-(4-fluorophenoxypropionic acid, respectively, to produce the sodium salt of 6-[α-(2-chlorophenoxy)propionamido]penicillanic acid,
6-[α-(4-sulfamylphenoxy)-n-butyramido]penicillanic acid,
6-[α-(3,4-dimethoxyphenoxy)-n-pentanoamido]penicillanic acid,
6-[α-(3-methylphenoxy)isovaleramido]penicillanic acid,
6-[α-(4-methylthiophenoxy)propionamido]penicillanic acid, 6-[α-(4-dimethylaminophenoxy)-n-hexanoamido]penicillanic acid,
6-[α(2-methoxyphenoxy)-n-decanoamido]penicillanic acid,
6-[α-(2,4-dichlorophenoxy)phenylacetamido]penicillanic acid,
6-[α-(2-nitrophenoxy)-β-phenylpropionamido]penicillanic acid,
6-[α(2-acetamidophenoxy)-γ-phenylbutyramido)penicillanic acid,
6-[α-(2,4-dimethylphenoxy)-n-butyramido]penicillanic acid,
6-[α-(4-isopropylphenoxy)propionamido]penicillanic acid,
6-[α-(3-bromophenoxy)-n-butyramido]penicillanic acid,
6-[α-(2-iodophenoxy)phenylacetamido]penicillanic acid,
6-[α-(2-diethylaminophenoxy)isovaleramido]penicillanic acid,
6-[α-(3,5-dichlorophenoxy)isohexanoamido]penicillanic acid,
6-[α(4-cyclohexylphenoxy)propionamido]penicillanic acid,
6-[α-pheonxy-isovaleramido]penicillanic acid,
6-[α-phenoxy-n-decanoamido]penicillanic acid,
6-[α-phenoxy-γ-phenylbutyramido]penicillanic acid,
6-[α-(2-benzylphenoxy)-n-butyramido]penicillanic acid,
6-[α(2-trifluoromethylphenoxy)propionamide]penicillanic acid, and
6-[α-(4-fluorophenoxy)propionamido]penicillanic acid, respectively.

EXAMPLES 36 TO 66

In the procedure of Example 7 the phenoxyacetyl chloride is replaced by an equimolar amount of the acid chloride of α-phenylthiopropionic acid,
α-paranitrophenylthiopropionic acid,
α-parachlorophenylthiopropionic acid,
α-phenylthiobutyric acid,
α-phenylthiocaproic acid,
α-phenylthioisovaleric acid,
α-(4-t-butylphenylthio)propionic acid,
α-ortho-tolylthiopropionic acid,
α-ortho-nitrophenylthiopropionic acid,
α-parachlorophenylthiobutyric acid,
α-(3,4,5-trichlorophenylthio)propionic acid,
α-(3-trifluoromethylphenylthio)butyric acid,
α-parabromophenylthioisovaleric acid,
α-paraphenylphenylthiopropionic acid,
α-(4-methoxyphenylthio)caproic acid,
α-(4-cyclohexylphenylthio)butyric acid,
α-phenylthio-α-cyclohexylacetic acid,
α-phenylthio-α-cyclopentylacetic acid,
α-(2,4-dichlorophenylthio)caproic acid,
α-(2,4-diisoamylphenylthio)propionic acid,
α-(4-benzylphenylthio)propionic acid,
α-(4-sulfamylphenylthio)butyric acid,
α-(2-allyoxyphenylthio)propionic acid,
α-(4-allylphenylthio)isovaleric acid,
α-(4-dimethylaminophenylthio)propionic acid,
α-(2,5-dichlorophenylthio)butyric acid,
α-(2-iodophenylthio)propionic acid,
α-(2-acetamidophenylthio)propionic acid,
α-(4-diethylaminophenylthio)propionic acid, and
α-(3-fluorophenylthio)butyric acid, respectively to produce the sodium salt of 6-(α-phenylthiopropionamido)penicillanic acid,
6-(α-paranitrophenylthiopropionamido)penicillanic acid,
6-(α-parachlorophenylthiopropionamido)penicillanic acid,
6-(α-phenylthiobutyramido)penicillanic acid,
6-(α-phenylthiocaproamido)penicillanic acid,
6-(α-phenylthioisovaleramido)penicillanic acid,
6-[α-(4-t-butylphenylthio)propionamido]penicillanic acid,
6-[α-ortho-tolylthiopropionamido]penicillanic acid,
6-(α-ortho-nitrophenylthiopropionamido)penicillanic acid,
6-(α-parachlorophenylthiobutyramido)penicillanic acid,
6-[α-(3,4,5-trichlorophenylthio)propionamido]penicillanic acid,
6-[α-(3-trifluoromethylphenylthio)butyramido]penicillanic acid,
6-(α-parabromophenylthioisovaleramido)penicillanic acid,
6-(α-paraphenylphenylthiopropionamido)penicillanic acid,
6-[α-(4-methoxyphenylthio)caproamido]penicillanic acid,
6-[α-(4-cyclohexylphenylthio)butyramido]penicillanic acid,
6-(α-phenylthio-α-cyclohexylacetamido)penicillanic acid,
6-(α-phenylthio-α-cyclopentylacetamido)penicillanic acid,
6-[α-(2,4-dichlorophenylthio)caproamido]penicillanic acid,
6-[α-(2,4-diisoamylphenylthio)propionamido]penicillanic acid,
6-[α-(4-benzylphenylthio)propionamido]penicillanic acid,
6-[α-(4-sulfamylphenylthio)butyramido]penicillanic acid,
6-[α-(2-allyloxyphenylthio)propionamido]penicillanic acid,
6-[α-(4-allylphenylthio)isovaleramido]penicillanic acid,
6-[α-(4-dimethylaminophenylthio)propionamido]penicillanic acid,
6-[α-(2,5-dichlorophenylthio)butyramido]penicillanic acid,
6-[α-(2-iodophenylthio)propionamido]penicillanic acid,
6-[α-(2-acetamidophenylthio)propionamido]penicillanic acid,
6-[α-(4-diethylaminophenylthio)propionamido]penicillanic acid, and
6-[α-(3-fluorophenylthio)butyramido]penicillanic acid, respectively.

EXAMPLES 67 TO 81

In the procedure of Example 7 the phenoxyacetyl chloride is replaced by an equimolar amount of the acid chloride of D,L-α-amino-(3-thienyl)acetic acid,
α-amino-(5-ethyl-2-thienyl)acetic acid,
α-amino-(5-methyl-2-thienyl)acetic acid,
α-amino-(5-t-butyl-2-thienyl)acetic acid,
α-amino-(2,5-dimethyl-3-thienyl)acetic acid,
α-amino-(5-chloro-2-thienyl)acetic acid,
α-amino-(5-bromo-2-thienyl)acetic acid,
α-amino-(5-phenyl-3-chloro-2-thienyl)acetic acid,
α-amino-(3,5-dimethyl-2-thienyl)acetic acid,
α-amino-(5-cyclohexyl-2-thienyl)acetic acid,
α-amino-(5-diethylamino-2-thienyl)acetic acid,
α-amino-(4-methylsulfonyl-2-thienyl)acetic acid,
α-amino-(3-ethylthio-2-thienyl)acetic acid, and
α-amino-(4-cycloheptyloxy-2-thienyl)acetic acid, respectively, to produce the sodium salt of D,L-6-[α-amino-(3-thienyl)acetamido]penicillanic acid,
6-[α-amino-(5-ethyl-2-thienyl)acetamido]penicillanic acid,
6-[α-amino-(5-methyl-2-thienyl)acetamido]penicillanic acid,
6-[α-amino-(5-t-butyl-2-thienyl)acetamido]penicillanic acid,
6-[α-amino-(2,5-dimethyl-3-thienyl)acetamido]penicillanic acid,
6-[α-amino-(5-chloro-2-thienyl)acetamido]penicillanic acid, 6-[α-amino-(5-bromo-2-thienyl)acetamido]penicillanic acid,
6-[α-amino-(5-phenyl-3-chloro-2-thienyl)acetamido]penicillanic acid,
6-[α-amino-(3,5-dimethyl-2-thienyl)acetamido]penicillanic acid,
6-[α-amino-(5-cyclohexyl-2-thienyl)acetamido]penicillanic acid,
6-[α-amino-(5-diethylamino-2-thienyl)acetamido]penicillanic acid,
6-[α-amino-(4-methylsulfonyl-2-thienyl)acetamido]penicillanic acid,
6-[α-amino-(3-ethylthio-2-thienyl)acetamido]penicillanic acid, and
6-[α-amino-(4-cycloheptyloxy-2-thienyl)acetamido]penicillanic acid, respectively.

EXAMPLES 82 TO 105

In the procedure of Example 7 the phenoxyacetyl chloride is replaced by an equimolar amount of the acid chloride of α-amino-p-chlorophenylacetic acid,
α-amino-p-methoxyphenylacetic acid,
L-(+)-α-aminophenylacetic acid,
α-amino-4-diethylaminophenylacetic acid,
α-amino-4-trifluoromethylphenylacetic acid,
α-amino-2,4-dibromophenylacetic acid,
α-amino-2-nitrophenylacetic acid,
α-amino-3-methylphenylacetic acid,
α-amino-4-sulfamylphenylacetic acid,
α-amino-2-iodophenylacetic acid,
α-amino-4-t-butylphenylacetic acid,
α-amino-2-acetamidophenylacetic acid,
α-amino-3-nitrophenylacetic acid,
α-amino-3,4-dimethoxyphenylacetic acid,
α-amino-4-dimethylaminophenylacetic acid,
α-amino-2,4-dichlorophenylacetic acid,
α-amino-4-isopropylphenylacetic acid,
α-amino-3-bromophenylacetic acid,
α-amino-3-iodophenylacetic acid,
α-amino-2-diethylaminophenylacetic acid,
α-amino-2-trifluoromethylphenylacetic acid,
α-amino-4-fluorophenylacetic acid, and
α-amino-3,4,5-trifluoromethylphenylacetic acid, respectively, to produce the sodium salt of 6-(α-amino-p-chlorophenylacetamido)penicillanic acid,
6-(α-amino-p-methoxyphenylacetamido)penicillanic acid,
6-[L-(+)-α-aminophenylacetamido]penicillanic acid,
6-(α-amino-4-diethylaminophenylacetamido)penicillanic acid,
6-(α-amino-4-trifluoromethylphenylacetamido)penicillanic acid,
6-(α-amino-2,4-dibromophenylacetamido)penicillanic acid,
6-(α-amino-2-nitrophenylacetamido)penicillanic acid,
6-(α-amino-3-methylphenylacetamido)penicillanic acid,
6-(α-amino-4-sulfamylphenylacetamido)penicillanic acid,
6-(α-amino-2-iodophenylacetamido)penicillanic acid,
6-(α-amino-4-t-butylphenylacetamido)penicillanic acid,
6-(α-amino-2-acetamidophenylacetamido)penicillanic acid,
6-(α-amino-3-nitrophenylacetamido)penicillanic acid,
6-(α-amino-3,4-dimethoxyphenylacetamido)penicillanic acid,
6-(α-amino-4-dimethylaminophenylacetamido)penicillanic acid,
6-(α-amino-2,4-dichlorophenylacetamido)penicillanic acid,
6-(α-amino-4-isopropylphenylacetamido)penicillanic acid,
6-(α-amino-3-bromophenylacetamido)penicillanic acid,
6-(α-amino-3-iodophenylacetamido)penicillanic acid,
6-(α-amino-2-diethylaminophenylacetamido)penicillanic acid,
6-(α-amino-2-trifluoromethylphenylacetamido)penicillanic acid,
6-(α-amino-4-fluorophenylacetamido)penicillanic acid, and
6-(α-amino-3,4,5-trifluoromethylphenylacetamido)penicillanic acid, respectively.

EXAMPLES 106 TO 177

In the procedure of Example 7, the phenoxyacetyl chloride is replaced by an equimolar amount of benzoyl chloride,
3,5-dinitrobenzoyl chloride,
2-chlorobenzoyl chloride,
2-methylbenzoyl chloride,
4-aminobenzoyl chloride,
4-nitrobenzoyl chloride,
4-hydroxybenzoyl chloride,
3,4,5-trimethoxybenzoyl chloride,
4-methylbenzoyl chloride,
4-chlorobenzoyl chloride,
3,4-dichlorobenzoyl chloride,
3-nitrobenzoyl chloride,
2,4,6-trimethoxybenzoyl chloride,
2-hydroxybenzoyl chloride,
4-ethoxybenzoyl chloride,
2,6-dimethoxybenzoyl chloride,
2,4,6-trimethylbenzoyl chloride,
2,6-dichlorobenzoyl chloride,
2,6-diethoxybenzoyl chloride,
2,6-di-n-butoxybenzoyl chloride,
2,6-dibenzyloxybenzoyl chloride,
2,3,6-trimethoxybenzoyl chloride,
2,4,6-tribromobenzoyl chloride,
2,6-di-n-propoxybenzoyl chloride,
2,6-dimethoxy-4-methylbenzoyl chloride,
4,6-diethyl-2-methoxybenzoyl chloride,
6-ethoxy-2-methoxybenzoyl chloride,
2-methylthiobenzoyl chloride,
2-benzylthiobenzoyl chloride,
2-phenoxybenzoyl chloride,
2-phenylbenzoyl chloride,
2-methoxybenzoyl chloride,
4-sulfamylbenzoyl chloride,
3,4-dimethoxybenzoyl chloride,
4-methoxybenzoyl chloride,
3-methylbenzoyl chloride,
3-dimethylaminobenzoyl chloride,
2-methoxybenzoyl chloride,
2-chloro13,4,5-trimethoxybenzoyl chloride,
2,4-dichlorobenzoyl chloride,
2-nitrobenzoyl chloride,
4-methylaminobenzoyl chloride,
2-acetamidobenzoyl chloride,
2,4-dimethylbenzoyl chloride,
2,4,5-trimethylbenzoyl chloride,
4-isopropylbenzoyl chloride,
3-bromobenzoyl chloride,
2-iodobenzoyl chloride,
2-ethylaminobenzoyl chloride,
2,5-dihydroxybenzoyl chloride,
4-hydroxy-3-methoxybenzoyl chloride,
4-allylbenzoyl chloride,
4-allyloxybenzoyl chloride,
2-trifluoromethylbenzoyl chloride,
4-fluorobenzoyl chloride,
2-phenylthiobenzoyl chloride,
2-benzylbenzoyl chloride
2,6-dihydroxybenzoyl chloride,
2,6-diacetoxybenzoyl chloride,
2,6-dimethylthiobenzoyl chloride, 2,4,6-trinitrobenzoyl chloride,
2,6-diacetamidobenzoyl chloride,
2,6-dibromobenzoyl chloride,
2,6-dimethylbenzoyl chloride,
2,6-diethylbenzoyl chloride,
2,6-diisopropylbenzoyl chloride,
2,6-diallyloxybenzoyl chloride,
3-bromo-2,6-dimethoxybenzoyl chloride,
4-chloro-2,6-dimethoxybenzoyl chloride,
2-chloro-6-nitrobenzoyl chloride, and
2-hydroxy-6-methoxybenzoyl chloride, respectively, to produce the sodium salt of 6-(benzamido)penicillanic acid,
6-(3,5-dinitrobenzamido)penicillanic acid,
6-(2-chlorobenzamido)penicillanic acid,
6-(2-methylbenzamido)penicillanic acid,
6-(4-aminobenzamido)penicillanic acid,
6-(4-nitrobenzamido)penicillanic acid,
6-(4-hydroxybenzamido)penicillanic acid,
6-(3,4,5-trimethoxybenzamido)penicillanic acid,
6-(4-methylbenzamido)penicillanic acid,
6-(4-chlorobenzamido)penicillanic acid,
6-(3,4-dichlorobenzamido)penicillanic acid,
6-(3-nitrobenzamido)penicillanic acid,
6-(2,4,6-trimethoxybenzamido)penicillanic acid,
6-(2-hydroxybenzamido)penicillanic acid,
6-(4-ethoxybenzamido)penicillanic acid,
6-(2,6-dimethoxybenzamido)penicillanic acid,
6-(2,4,6-trimethylbenzamido)penicillanic acid,
6-(2,6-dichlorobenzamido)penicillanic acid,
6-(2,6-diethoxybenzamido)penicillanic acid,
6-(2,6-di-n-butoxybenzamido)penicillanic acid,
6-(2,6-dibenzoxybenzamido)penicillanic acid,
6-(2,3,6-trimethoxybenzamido)penicillanic acid,
6-(2,4,6-tribromobenzamido)penicillanic acid,
6-(2,6-di-n-propoxybenzamido)penicillanic acid,
6-(2,6-dimethoxy-4-methylbenzamido)penicillanic acid,
6-(4,6-diethyl-2-methoxybenzamido)penicillanic acid,
6-(6-ethoxy-2-methoxybenzamido)penicillanic acid,
6-(2-methylthiobenzamido)penicillanic acid,
6-(2-benzylthiobenzamido)penicillanic acid,
6-(2-phenoxybenzamido)penicillanic acid,
6-(2-phenylbenzamido)penicillanic acid,
6-(2-methoxybenzamido)penicillanic acid,
6-(4-sulfamylbenzamido)penicillanic acid,
6-(3,4-dimethoxybenzamido)penicillanic acid,
6-(4-methoxybenzamido)penicillanic acid,
6-(3-methylbenzamido)penicillanic acid,
6-(3-dimethylaminobenzamido)penicillanic acid,
6-(2-methoxybenzamido)penicillanic acid,
6-(2-chloro-3,4,5-trimethoxybenzamido)penicillanic acid,
6-(2,4-dichlorobenzamido)penicillanic acid,
6-(2-nitrobenzamido)penicillanic acid,
6-(4-methylaminobenzamido)penicillanic acid,
6-(2-acetamidobenzamido)penicillanic acid,
6-(2,4-dimethylbenzamido)penicillanic acid,
6-(2,4,5-trimethylbenzamido)penicillanic acid,
6-(4-isopropylbenzamido)penicillanic acid,
6-(3-bromobenzamido)penicillanic acid,
6-(2-iodobenzamido)penicillanic acid,
6-(2-ethylaminobenzamido)penicillanic acid,
6-(2,5-dihydroxybenzamido)penicillanic acid,
6-(4-hydroxy-3-methoxybenzamido)penicillanic acid,
6-(4-allylbenzamido)penicillanic acid,
6-(4-allyloxybenzamido)penicillanic acid,
6-(2-trifluoromethylbenzamido)penicillanic acid,
6-(4-fluorobenzamido)penicillanic acid,
6-(2-phenylthiobenzamido)penicillanic acid,
6-(2-benzylbenzamido)penicillanic acid,
6-(2,6-dihydroxybenzamido)penicillanic acid,
6-(2,6-diacetoxybenzamido)penicillanic acid,
6-(2,6-dimethylthiobenzamido)penicillanic acid,
6-(2,4,6-trinitrobenzamido)penicillanic acid,
6-(2,6-diacetamidobenzamido)penicillanic acid,
6-(2,6-dibromobenzamido)penicillanic acid,
6-(2,6-dimethylbenzamido)penicillanic acid,
6-(2,6-diethylbenzamido)penicillanic acid,
6-(2,6-diisopropylbenzamido)penicillanic acid,
6-(2,6-diallyloxybenzamido)penicillanic acid,
6-(3-bromo-2,6-dimethoxybenzamido)penicillanic acid,
6-(4-chloro-2,6-dimethoxybenzamido)penicillanic acid,
6-(2-chloro-6-nitrobenzamido)penicillanic acid, and
6-(2-hydroxy-6-methoxybenzamido)penicillanic acid, respectively.

EXAMPLES 178 TO 189

In the procedure of Example 7, the phenoxyacetyl chloride is replaced by an equimolar amount of (4-nitrophenyl)acetyl chloride,
(4-bromophenyl)acetyl chloride,
(4-t-butylphenyl)acetyl chloride,
(4-trifluoromethylphenyl)acetyl chloride,
(3-fluorophenyl)acetyl chloride,
(4-sulfamylphenyl)acetyl chloride,
(2-benzylphenyl)acetyl chloride,
(3-methoxyphenyl)acetyl chloride,
(2-iodophenyl)acetyl chloride,
(3-diethylaminophenyl)acetyl chloride, and
(2,4-diisoamylphenyl)acetyl chloride, respectively, to produce the sodium salt of 6-[α-(4-nitrophenyl)acetamido]penicillanic acid,
6-[α-(4-bromophenyl)acetamido]penicillanic acid,
6-[α-(4-t-butylphenyl)acetamido]penicillanic acid,
6-[α-(4-trifluoromethylphenyl)acetamido]penicillanic acid,
6-[α-(3-fluorophenyl)acetamido]penicillanic acid,
6-[α-(4-sulfamylphenyl)acetamido]penicillanic acid,
6-[α-(2-benzylphenyl)acetamido]penicillanic acid,
6-[α-(3-methoxyphenyl)acetamido]penicillanic acid,
6-[α-(2-iodophenyl)acetamido]penicillanic acid,
6-[α-(3-diethylaminophenyl)acetamido]penicilanic acid, and
6-[α-(2,4-diisoamylphenyl)acetamido]penicillanic acid, respectively.

EXAMPLES 190 TO 238

In the procedure of Example 7, the phenoxyacetyl chloride is replaced by an equimolar amount of 3-m-chlorophenyl-5-methyl-4-isoxazole-4-carbonyl chloride,
3-(2,4-dichlorophenyl)-5-methyl-4-isoxazole-4-carbonyl chloride,
3-(3,4-dichlorophenyl)-5-methyl-4-isoxazole-4-carbonyl chloride,
3-p-tolyl-5-methyl-4-isoxazole-4-carbonyl chloride,
3-o-nitrophenyl-5-methyl-4-isoxazole-4-carbonyl chloride,
3-m-nitrophenyl-5-methyl-4-isoxazole-4-carbonyl chloride
3-p-nitrophenyl-5-methyl-4-isoxazole-4-carbonyl chloride,
3-p-bromophenyl-5-methyl-4-isoxazole-4-carbonyl chloride
3-p-fluorophenyl-5-methyl-4-isoxazole-4-carbonyl chloride,
3-p-methylsulfonylphenyl-5-methyl-4-isoxazole-4-carbonyl chloride, 3-p-methoxyphenyl-5-methyl-4-isoxazole-4-carbonyl chloride,
3-p-trifluoromethylphenyl-5-methyl-4-isoxazole-4-carbonyl chloride,
3-o-methoxyphenyl-5-methyl-4-isoxazole-4-carbonyl chloride,
3-p-ethoxyphenyl-5-methyl-4-isoxazole-4-carbonyl chloride,
3-(3,4-dimethoxyphenyl)-5-methyl-4-isoxazole-4-carbonyl chloride,
3-p-dimethylaminophenyl-5-methyl-4-isoxazole-4-carbonyl chloride,
3-α-naphthyl-5-methyl-4-isoxazole-4-carbonyl chloride,
3-β-naphthyl-5-methyl-4-isoxazole-4-carbonyl chloride,
3-phenyl-5-ethyl-4-isoxazole-4-carbonyl chloride,
3-p-chlorophenyl-5-ethyl-4-isoxazole-4-carbonyl chloride,
3-phenyl-5-isopropyl-4-isoxazole-4-carbonyl chloride,
3-phenyl-5-methylmercapto-4-isoxazole-4-carbonyl chloride,
3-methyl-5-o-chlorophenyl-4-isoxazole-4-carbonyl chloride,
3-methyl-5-p-bromophenyl-4-isoxazole-4-carbonyl chloride,
3-methyl-5-o-iodophenyl-4-isoxazole-4-carbonyl chloride,
3-methyl-5-(2,4-dichlorophenyl)-4-isoxazole-4-carbonyl chloride,
3-methyl-5-m-nitrophenyl-4-isoxazole-4-carbonyl chloride,
3-methyl-5-p-tolyl-4-isoxazole-4-carbonyl chloride,
3-methyl-5-p-nitrophenyl-4-isoxazole-4-carbonyl chloride,
3-methyl-5-p-methoxyphenyl-4-isoxazole-4-carbonyl chloride,
3-methyl-5-p-ethoxyphenyl-4-isoxazole-4-carbonyl chloride,
3-methyl-5-(2,6-dimethoxyphenyl)-4-isoxazole-4-carbonyl chloride,
3-methyl-5-p-methylsulfonylphenyl-4-isoxazole-4-carbonyl chloride,
3-methyl-5-p-fluorophenyl-4-isoxazole-4-carbonyl chloride,
3-methyl-5-p-cyanophenyl-4-isoxazole-4-carbonyl chloride,
3-methyl-5-p-methylmercaptophenyl-4-isoxazole-4-carbonyl chloride,
3-methyl-5-p-dimethylaminophenyl-4-isoxazole-4-carbonyl chloride,
3-methyl-5-α-naphthyl-4-isoxazole-4-carbonyl chloride,
3-methyl-5-β-naphthyl-4-isoxazole-4-carbonyl chloride,
3-ethyl-5-phenyl-4-isoxazole-4-carbonyl
3-ethyl-5-p-chlorophenyl-4-isoxazole-4-carbonyl chloride,
3-isopropyl-5-phenyl-4-isoxazole-4-carbonyl chloride,
3-tert. butyl-5-methyl-4-isoxazole-4-carbonyl chloride,
3-methyl-5-p-trifluoromethylphenyl-4-isoxazole-4-carbonyl chloride,
3-methyl-5-cyclohexyl-4-isoxazole-4-carbonyl chloride,
3-cyclohexyl-5-methyl-4-isoxazole-4-carbonyl chloride,
3-α-furyl-5-methyl-4-isoxazole-4-carbonyl chloride, and
3-α-thienyl-5-methyl-4-isoxazole-4-carbonyl chloride, respectively, to produce the sodium salt of 3-m-chlorophenyl-5-methyl-4-isoxazolylpencillanic acid,
3-(2,4-dichlorophenyl)-5-methyl-4-isoxazolylpenicillanic acid,
3-(3,4-dichlorophenyl)-5-methyl-4-isoxazolylpenicillanic acid,
3-p-tolyl-5-methyl-4-isoxazolylpenicillanic acid,
3-o-nitrophenyl-5-methyl-4-isoxazolylpenicillanic acid,
3-m-nitrophenyl-5-methyl-4-isoxazolylpenicillanic acid,
3-p-nitrophenyl-5-methyl-4-isoxazolylpenicillanic acid,
3-p-bromophenyl-5-methyl-4-isoxazolylpenicillanic acid,
3-p-fluorophenyl-5-methyl-4-isoxazolylpenicillanic acid,
3-p-methylsulfonylphenyl-5-methyl-4-isoxazolylpenicillanic acid,
3-p-methoxyphenyl-5-methyl-4-isoxazolylpenicillanic acid,
3-p-trifluoromethylphenyl-5-methyl-4-isoxazolylpenicillanic acid,
3-o-methoxyphenyl-5-methyl-4-isoxazolylpenicillanic acid,
3-p-ethoxyphenyl-5-methyl-4-isoxazolylpenicillanic acid,
3-(3,4-dimethoxyphenyl)-5-methyl-4-isoxazolylpenicillanic acid,
3-p-dimethylaminophenyl-5-methyl-4-isoxazolylpenicillanic acid,
3-α-naphthyl-5-methyl-4-isoxazolylpenicillanic acid,
3-β-naphthyl-5-methyl-4-isoxazolylpenicillanic acid,
3-phenyl-5-ethyl-4-isoxazolylpenicillanic acid,
3-p-chlorophenyl-5-ethyl-4-isoxazolylpenicillanic acid,
3-phenyl-5-isopropyl-4-isoxazolylpenicillanic acid,
3-phenyl-5-methylmercapto-4-isoxazolylpenicillanic acid,
3-methyl-5-o-chlorophenyl-4-isoxazolylpenicillanic acid,
3-methyl-5-p-bromophenyl-4-isoxazolylpenicillanic acid,
3-methyl-5-o-iodophenyl-4-isoxazolylpenicillanic acid,
3-methyl-5-(2,4-dichlorophenyl)-4-isoxazolylpenicillanic acid,
3-methyl-5-m-nitrophenyl-4-isoxazolylpenicillanic acid,
3-methyl-5-p-tolyl-4-isoxazolylpenicillanic acid,
3-methyl-5-p-nitrophenyl-4-isoxazolylpenicillanic acid,
3-methyl-5-p-methoxyphenyl-4-isoxazolylpenicillanic acid,
3-methyl-5-p-ethoxyphenyl-4-isoxazolylpenicillanic acid,
3-methyl-5-(2,6-dimethoxyphenyl)-4-isoxazolylpenicillanic acid,
3-methyl-5-p-methylsulfonylphenyl-4-isoxazolylpenicillanic acid,
3-methyl-5-p-fluorophenyl-4-isoxazolylpenicillanic acid,
3-methyl-5-p-cyanophenyl-4-isoxazolylpenicillanic acid,
3-methyl-5-p-methylmercaptophenyl-4-isoxazolylpenicillanic acid, 3-methyl-5-p-dimethylaminophenyl-4-isoxazolyl-
  penicillanic acid,
3-methyl-5-α-naphthyl-4-isoxazolylpenicillanic
  acid,
3-methyl-5-β-naphthyl-4-isoxazolylpenicillanic
  acid,
3-ethyl-5-phenyl-4-isoxazolylpenicillanic
  acid,
3-ethyl-5-p-chlorophenyl-4-isoxazolylpenicillanic
  acid,
3-isopropyl-5-phenyl-4-isoxazolylpenicillanic
  acid,
3-tert. butyl-5-methyl-4-isoxazolylpenicillanic
  acid,
3-methyl-5-p-trifluoromethylphenyl-4-isoxazolyl-
  penicillanic acid,
3-methyl-5-cyclohexyl-4-isoxazolylpenicillanic
  acid,
3-cyclohexyl-5-methyl-4-isoxazolylpenicillanic
  acid,
3-α-furyl-5-methyl-4-isoxazolylpenicillanic
  acid, and
3-α-thienyl-5-methyl-4-isoxazolylpenicillanic
  acid, respectively.

EXAMPLES 239 TO 254

In the procedure of Example 7, the phenoxyacetyl chloride is replaced by an equimolar amount of 3,5-diphenyl-4-isoxazole-4-carbonyl chloride,
3-methyl-5-phenyl-4-isoxazole-4-carbonyl chloride,
3,5-dimethyl-4-isoxazole-4-carbonyl chloride,
5-benzyl-3-methyl-4-isoxazole-4-carbonyl
  chloride,
3-methyl-5-styryl-4-isoxazole-4-carbonyl
  chloride,
5-tert. butyl-3-phenyl-4-isoxazole-4-carbonyl
  chloride,
5-(2-furyl)-3-methyl-4-isoxazole-4-carbonyl
  chloride,
3-methyl-5-(3',5'-dimethyl-4'-isoxazolyl)-4-isoxazole-
  4-carbonyl chloride,
3-methyl-5-(2-thienyl)-4-isoxazole-4-carbonyl
  chloride,
3-(p-chlorophenyl)-5-methyl-4-isoxazole-4-carbonyl
  chloride,
3-methyl-5-methylmercapto-4-isoxazole-4-carbonyl
  chloride,
5-(p-chlorophenyl)-3-methyl-4-isoxazole-4-carbonyl
  chloride,
3-methyl-5-(o-nitrophenyl)-4-isoxazole-4-carbonyl
  chloride,
5-isopropyl-3-methyl-4-isoxazole-4-carbonyl
  chloride, and
5-methyl-3-(p-chlorophenyl)-4-isoxazole-4-carbonyl
  chloride, respectively, to produce the sodium salt of 3,5-diphenyl-4-isoxazolylpenicillanic acid,
3-methyl-5-phenyl-4-isoxazolylpenicillanic acid,
3,5-dimethyl-4-isoxazolylpenicillanic acid,
5-benzyl-3-methyl-4-isoxazolylpenicillanic acid,
3-methyl-5-styryl-4-isoxazolylpenicillanic acid,
5-tert. butyl-3-phenyl-4-isoxazolylpenicillanic acid,
5-(2-furyl)-3-methyl-4-isoxazolylpenicillanic acid,
3-methyl-5-(3',5'-dimethyl-4'-isoxazolyl)-4-isoxazolyl-
  penicillanic acid,
3-methyl-5-(2-thienyl)-4-isoxazolylpenicillanic
  acid,
3-(p-chlorophenyl)-5-methyl-4-isoxazolylpenicillanic
  acid,
3-methyl-5-methylmercapto-4-isoxazolylpenicillanic
  acid,
5-(p-chlorophenyl)-3-methyl-4-isoxazolylpenicillanic
  acid,
3-methyl-5-(o-nitrophenyl)-4-isoxazolylpenicillanic
  acid,
5-isopropyl-3-methyl-4-isoxazolylpenicillanic
  acid and
5-methyl-3-(p-chlorophenyl)-4-isoxazolylpenicillanic
  acid, respectively.

EXAMPLES 255 TO 269

In the procedure of Example 5, the D-(—)-2-phenyl-glycyl chloride hydrochloride is replaced with an equimolar amount of α-(3-thienyl)glycyl chloride,
α-(5-ethyl-2-thienyl)glycyl chloride,
α-(5-methyl-2-thienyl)glycyl chloride,
α-(5-t-butyl-2-thienyl)glycyl chloride,
α-(2,5-dimethyl-3-thienyl)glycyl chloride,
α-(5-chloro-2-thienyl)glycyl chloride,
α-(5-bromo-2-thienyl)glycyl chloride,
α-(5-phenyl-3-chloro-2-thienyl)glycyl chloride,
α-(3,5-dimethyl-2-thienyl)glycyl chloride,
α-(5-cyclohexyl-2-thienyl)glycyl chloride,
α-(5-diethylamino-2-thienyl)glycyl chloride,
α-(4-methylsulfonyl-2-thienyl)glycyl chloride,
α-(3-ethylthio-2-thienyl)glycyl chloride, and
α-(4-cycloheptyloxy-2-thienyl)glycyl chloride, respectively, to produce D,L-6-[α-amino-(3-thienyl)acetamido]penicillanic acid,
6-[α-amino(5-ethyl-2-thienyl)acetamido]penicillanic acid,
6-[α-amino(5-methyl-2-thienyl)acetamido]penicillanic
  acid,
6-[α-amino(5-t-butyl-2-thienyl)acetamido]penicillanic
  acid,
6-[α-amino-(2,5-dimethyl-3-thienyl)acetamido]peni-
  cillanic acid,
6-[α-amino-(5-chloro-2-thienyl)acetamido]penicillanic
  acid,
6-[α-amino-(5-bromo-2-thienyl)acetamido]penicillanic
  acid,
6-[α-amino-(5-phenyl-3-chloro-2-thienyl)acetamido]
  penicillanic acid,
6-[α-amino-(3,5-dimethyl-2-thienyl)acetamido]penicil-
  lanic acid,
6-[α-amino-(5-cyclohexyl-2-thienyl)acetamido]penicil-
  lanic acid,
6-[α-amino-(5-diethylamino-2-thienyl)acetamido]peni-
  cillanic acid,
6-[α-amino-(4-methylsulfonyl-2-thienyl)acetamido]peni-
  cillanic acid,
6-[α-amino-(3-ethylthio-2-thienyl)acetamido]penicil-
  lanic acid, and
6-[α-amino-(4-cycloheptyloxy-2-thienyl)acetamido]peni-
  cillanic acid, respectively.

EXAMPLES 270 TO 280

In the procedure of Example 5, the D-(—)-2-phenyl-glycyl chloride is replaced with an equimolar amount of α-(1-naphthyl)glycyl chloride,
α-(2-naphthyl)glycyl chloride,
α-(1-chloro-2-naphthyl)glycyl chloride,
α-(2-methyl-7-naphthyl)glycyl chloride,
α-(6-nitro-1-naphthyl)glycyl chloride,
α-(2,7-dibromo3-naphthyl)glycyl chloride,
α-(4-trifluoromethyl-1-naphthyl)glycyl chloride,
α-(8-iodo-1-naphthyl)glycyl chloride,
α-(1-methoxy-2-naphthyl)glycyl chloride, and
α-(4-acetamido-1-naphthyl)glycyl chloride, respectively, to produce 6-[α-amino-(1-naphthyl)acetamido]penicillanic acid, 6-[α-amino-(2-naphthyl)acetamido]penicillanic acid,
6-[α-amino-(1-chloro-2-naphthyl)acetamido]penicillanic acid,
6-[α-amino-(2-methyl-7-naphthyl)acetamido]penicillanic acid,
6-[α-amino-(6-nitro-1-naphthyl)acetamido]penicillanic acid,
6-[α-amino-(2,7-dibromo-3-naphthyl)acetamido]penicillanic acid,
6-[α-amino-(4-trifluoromethyl-1-naphthyl)acetamido]penicillanic acid,
6-[α-amino-(8-iodo-1-naphthyl)acetamido]penicillanic acid,
6-[α-amino-(1-methoxy-2-naphthyl)acetamido]penicillanic acid, and
6-[α-amino-(4-acetamido-1-naphthyl)acetamido]penicillanic acid, respectively.

EXAMPLES 281 TO 288

In the procedure of Example 7, the phenoxyacetyl chloride is replaced by an equimolar amount of thiophene-2-carboxylic acid chloride,
thiophene-3-carboxylic acid chloride,
furan-2-carboxylic acid chloride,
furan-3-carboxylic acid chloride,
isonicotinyl chloride,
pyrrolidinecarboxylic acid chloride, and
N-methylpiperidine-3-carboxylic acid chloride, respectively, to produce the sodium salt of 6-(2-thiophene)carboxamidopenicillanic acid,
6-(3-thiophene)carboxamidopenicillanic acid,
6-(2-furan)carboxamidopenicillanic acid,
6-(3-furan)carboxamidopenicillanic acid,
6-isonicotinylcarboxamidopenicillanic acid,
6-pyrrolidinecarboxamidopenicillanic acid, and
6-[3-(N-methylpiperidine]carboxamidopenicillanic acid, respectively.

Any other penicillin may be prepared by the same procedures as illustrated above by substituting various other imine derivatives obtained from other aldehydes and reacting them with other of the many known acylating agents.

What is claimed is:

1. In a process for the production of 6-acylaminopenicillanic acids or salts or esters thereof, the improvement which comprises acylating the imine reaction product of 6-aminopenicillanic acid, or ammonium, alkali metal, alkaline earth metal or organic amine salt thereof or alkyl or aralkyl ester thereof with an alkanal, aralkanal, aralkenal or heterocyclic substituted alkanal, wherein the alkyl and alkenyl groups have up to about 12 carbon atoms, the aryl groups are monocyclic carbocyclic aryls and the heterocyclic groups are 5- to 6-membered (exclusive of hydrogen) monocyclic heterocyclics containing carbon, nitrogen, oxygen or sulfur.

2. A process for the production of 6-acylaminopenicillanic acid or a salt or ester thereof which comprises acylating an imine of the formula

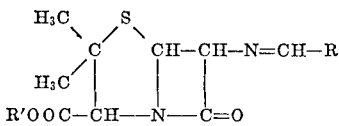

wherein R is hydrogen, alkyl of up to about 12 carbon atoms, alkenyl up to about 12 carbon atoms, monocyclic carbocyclic aryl, bicyclic carbocyclic aryl, aralkyl or aralkenyl wherein the aryl, alkyl and alkenyl groups of aralkyl and aralkenyl radicals are the same as previously defined, R' is hydrogen, alkyl, aralkyl as previously defined or an ammonium, alkali metal, alkaline earth metal or organic amine salt forming ion, to obtain the imine reaction product of the formula

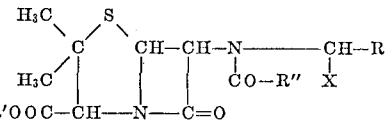

wherein R and R' are the same as previously defined, CO—R" is the acyl radical of the acylating agent and X is hydroxy, halogen, O-acyl, O-alkyl, O-aryl, amino, cyano or azido, wherein aryl is as previously defined and acyl is alkanoyl, aroyl or aralkanoyl, the alkyl and aryl groups are as previously defined, and hydrolyzing said imine reaction product.

3. A process as in claim 2 wherein R is alkyl up to about 12 carbon atoms, phenyl, halophenyl, hydroxyphenyl, nitrophenyl, lower alkoxyphenyl, phenyl-lower alkyl, halophenyl-lower alkyl, hydroxyphenyl-lower alkyl, nitrophenyl-lower alkyl, lower alkoxyphenyl-lower alkyl, phenyl-lower alkenyl, halophenyl-lower alkenyl, hydroxyphenyl-lower alkenyl, nitrophenyl-lower alkenyl or lower alkoxyphenyl-lower alkenyl, R' is hydrogen, lower alkyl, phenyl-lower alkyl, alkali metal, alkaline earth meta or amino, R" is phenoxy-lower alkyl, phenyl, lower alkoxyphenyl, di-lower alkoxyphenyl, isoxazolyl, phenylisoxazolyl, (lower alkyl)phenylisoxazolyl, (α-amino)-phenyl-lower alkyl, naphthyl, (lower alkyl)halophenylisoxazolyl or di-(lower alkyl)halophenyl isoxazolyl and X is hydroxy, halogen, O-lower alkanoyl, O-lower alkyl, O-phenyl or amino.

4. A process as in claim 2 wherein the acylating agent is the mixed anhydride of α-amino-phenylacetic acid.

5. A process as in claim 2 wherein R is hydroxyphenyl, R' is hydrogen and the acylating agent is phenoxyacetyl chloride.

6. A process as in claim 2 wherein R is hydroxyphenyl, R' is hydrogen and the acylating agent is 5-methyl-3-phenylisoxazole-4-carbonyl chloride.

7. A process as in claim 2 wherein R is hydroxyphenyl, R' is potassium and the acylating agent is 5-methyl-3-phenylisoxazole-4-carbonyl chloride.

8. A process as in claim 2 wherein R is lower alkyl, R' is tri(lower alkyl)amino and the acylating agent is 2,6-dimethoxybenzoyl chloride.

9. A process as in claim 8 wherein the lower alkyl group is methyl and the tri(lower alkyl)amino group is triethylamino.

10. A process as in claim 2 wherein R is phenyl-lower alkyl, R' is tri(lower alkyl)amino and the acylating agent is phenylglycyl chloride.

11. A process as in claim 10 wherein the phenyl-lower alkyl group is benzyl and the tri(lower alkyl)amino group is triethylamino.

12. A process as in claim 2 wherein R is phenyl, R' is potassium and the acylating agent is 3-o-chlorophenyl-5-methylisoxazole-4-carbonyl chloride.

13. A process as in claim 2 wherein R is phenyl, R' is potassium and the acylating agent is 3-(2,6-dichlorophenyl)-5-methylisoxazole-4-carbonyl chloride.

14. A process for the production of ampicillin or salt thereof which comprises acylating the benzylidene derivative of 6-APA or t-octylamine salt thereof with phenylglycyl chloride or salt thereof in anhydrous organic solvent and hydrolyzing the acylated imine reaction product.

15. A process for the production of phenoxymethyl penicillin or salt thereof which comprises acylating the benzylidene derivative of 6-APA or t-octylamine salt thereof with phenoxyacetyl chloride or salt thereof in anhydrous organic solvent and hydrolyzing the acylated imine reaction product.

16. A process for the production of cloxacillin of salt thereof which comprises acylating the benzylidene derivative of 6-APA or t-octylamine salt thereof with 3-o-chlorophenyl-5-methylisoxazole-4-carbonyl chloride in anhydrous organic solvent and hydrolyzing the acylated imine reaction product.

17. A process for the production of dicloxacillin or salt thereof which comprises acylating the benzylidene derivative of 6–APA or t-octylamine salt thereof with 3-(2,6-dichlorophenyl)-5-methylisoxazole-4-carbonyl chloride in anhydrous organic solvent and hydrolyzing the acylated imine reaction product.

18. A process for the production of ampicillin or salt thereof which comprises acylating the anisylidene derivative of 6–APA or t-octylamine salt thereof with N-carboxy anhydride of phenyl glycine and hydrolyzing the acylated imine reaction product.

References Cited
UNITED STATES PATENTS

| | | | |
|---|---|---|---|
| 3,341,518 | 9/1967 | Naito et al. | 260—239.1 |
| 3,453,263 | 7/1969 | Dvonch et al. | 260—239.1 |

NICHOLAS S. RIZZO, Primary Examiner

U.S. Cl. X.R.

424—271